United States Patent Office 3,143,392
Patented Aug. 4, 1964

3,143,392
PROCESS FOR PREPARING ALUMINUM SULFATE
Walter C. Saeman, Orange, Conn., assignor to Olin Mathieson Chemical Corporation, a corporation of Virginia
Filed June 9, 1961, Ser. No. 116,069
14 Claims. (Cl. 23—123)

This invention relates to extraction, and more particularly to the obtainment of substantially iron free crystals of aluminum sulfate from iron containing clays.

Aluminum sulfate is a major industrial commodity and is of even greater significance as an intermediate chemical compound in processes for extracting alumina from aluminiferous clays, shales and the like of wide occurrence throughout the world. In either case, the value of the aluminum sulfate is dependent on its purity. In this regard, extensive research has been and is being carried on to obtain an economical and commercially practical method of obtaining substantially iron-free aluminum sulfate from iron-bearing clays.

The problems attending the methods heretofore employed for obtaining substantially pure aluminum sulfate from iron-bearing clays had been two-fold; the first of these problems relates to difficulties in the substantially complete removal of iron as a contaminant of the aluminum sulfate desired, and the second of these problems involves the difficulty of providing an efficient and economical method for obtaining aluminum sulfate in crystals of sufficient purity and size suitable for their desired applications, particularly for conversion into alumina which is to be employed in the manufacture of aluminum metal. One method for extracting aluminum from clay comprises digesting the clay with sulfuric acid in order to leach and convert the aluminum content of the clay into aluminum sulfate, which salt goes into solution and is then separated while in solution from the undissolved clay residue by any appropriate manner, as by filtration and the like.

However, such digesting, with sulfuric acid, of iron-bearing clays also converts the iron into the iron sulfate which also goes into solution as a contaminant of the aluminum sulfate. This contamination of aluminum sulfate with the iron has been subject to extensive research to provide an efficient and economically feasible process for the separation and elimination of the contaminant, as evidenced in U.S. Letters Patent No. 2,476,979; 2,947,604; 2,947,605; 2,951,743 and 2,958,580. Although the heretofore known methods accord some degree of separation of the iron, they have not been of sufficient practicality to be acceptable for commercial production.

In conjunction with the problems attendant to the separation of iron in the extraction of aluminum clay, it is also necessary to provide a practical separation of the crystalline aluminum sulfate, from solution, in proper size and form suitable for commercial application. Of the various methods for recovering crystals from solution, crystallization offers attractive advantages if the salt can be formed into dense granular crystals so that the crystals can be easily separated from the mother liquor solution, and are also capable of efficient washing. In this respect, aluminum sulfate presents formidable obstacles to the use of crystallization as a means for recovering the salt in view of the fact that under all known conditions of crystallization the aluminum sulfate crystallizes in the form of thin, microscopic, mushy flakes suspended in viscous, gelatinous mother liquor also containing various concentration of basic aluminum sulfate. By careful and tedious manipulations, purified crystals of aluminum sulfate can be separated and recovered from the mother liquor, however, the crystals settle slowly and under conditions of filtration or centrifugation the thin-flake-like crystals pack into an impervious mass which resist the further passage of mother liquor or wash solution. In view of this behavior, there is no known economical method of recovering aluminum sulfate from solution on a commercial scale by crystallization. Nevertheless, in view of the great economic value and importance of substantially pure aluminum sulfate, much effort has been expended toward the development of methods for recovering aluminum sulfate from solution by crystallization. However, no method heretofore known has been found adaptable for commercial application. For example, the German Patent No. 131,314, issued to J. Bock on May 26, 1902, suggests the use of batch-wise evaporation of gently agitated solutions. Also, the German Patent No. 232,563, issued to Chem. Fabrische Griesheim-Elektron on March 27, 1911, suggests the utilization of substantial amounts of excess sulfuric acid on the solution to counteract the interference of the gelatinous aluminum sulfate in the mother liquor. More recently, U.S. Letters Patent No. 2,402,668 granted June 25, 1946, to P. S. Roller, attempts to counteract, at least partially, the adverse effect of the viscous mother liquor by thinning the same with inert water soluble organic diluents, such as methyl or ethyl alcohol. The steps of this process were submitted to pilot plant evaluation by the U.S. Bureau of Mines, as reported in "Report of Investigation 4351" by W. K. Cunningham et al., September 1948, entitled "A Process for Production of Iron-Free Alum." As reported therein, the authors also obtained thin, microscopic crystals difficult to separate from the mother liquor and described in part as "—a sticky mass with the consistency of putty" (p. 29 of R.I. 4351). Along alternate lines, H. Kretzschmer in U.S. Letters Patent No. 2,951,743, granted Sept. 6, 1960, suggests the use of "interrupted vacuum crystallization" as a special procedure for counteracting the viscous nature of the mother liquor by periodically injecting hot and dilute feed liquor into the suspension of crystals to thin the solution sufficiently to permit continued operation on a batch-wise basis for a sufficient time to form a recoverable yield of purified crystals. Nevertheless, the cost of these methods for recovering aluminum sulfate from solution by crystallization is still of sufficient magnitude to prevent the economic utilization and application of these processes.

In contrast to the above, the present invention contemplates a process for the continuous production of coarse, free-settling, granular crystals of substantially pure aluminum sulfate which can be rapidly and easily recovered from the solution, mother liquor, and which can also be washed efficiently to assure increased purity at a minimum of cost. The process of this invention, furthermore, utilizes the improvements in the art of crystallization described in applicant's prior U.S. Letters Patent Nos. 2,567,968; 2,827,366; 2,856,270 and 2,883,273.

Accordingly, it is the object of this invention to provide a novel method for economically extracting a substantially pure aluminum sulfate from aluminiferous clays, shales and other ores utilizing in conjunction therewith crystallization as a means for recovering aluminum sulfate in substantially pure crystalline form.

It is also an object of this invention to provide a novel method for obtaining, from iron containing clays, aluminum as a sulfate salt economically suitable for conversion to alumina for the manufacture of aluminum metal.

It is further an object of this invention to provide a novel and economical method for crystallizing aluminum sulfate substantially free of iron.

A still further object of this invention is to provide a novel method for crystallizing high-grade aluminum sulfate crystals from solution obtained from clays containing iron and aluminum.

Still another object of this invention is to provide a novel process for obtaining substantially iron free aluminum sulfate crystals from clays having a high iron content.

Other objects and advantages will become more apparent from the following description and drawings in which.

Figure 1:
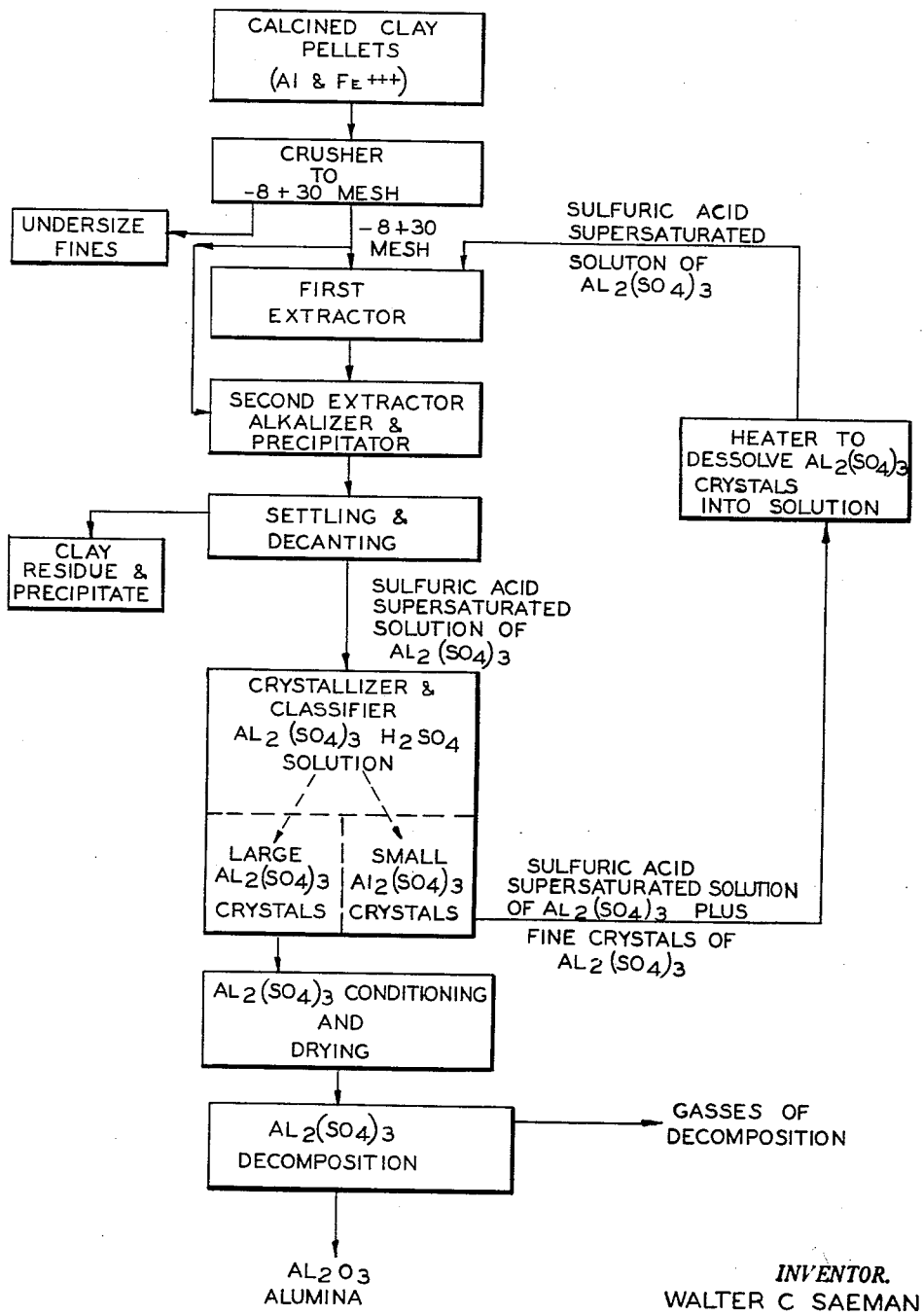
FIGURE 1 is a diagrammatic flow sheet of an embodiment of this invention.

Generally speaking, the invention comprehends the continuous introduction of a stream of a supersaturated solution of aluminum sulfate acidified with sulfuric acid into a lower part of a crystallizing vessel with the solution maintained at a temperature between about 50° F. to about 180° F. The solution, or mother liquor, is then suitably concentrated to induce crystallization of aluminum sulfate therefrom in the presence of sulfuric acid in concentrations of from about 3% to about 40%. Selectively orientated flow velocities induced within the solution or mother liquor establish and maintain two zones in the mother liquor to provide a classified system of aluminum sulfate crystals in each of these two zones. In this respect, the flow is of such velocity as to maintain the established zones. The zones formed will comprise an agitated zone wherein the solution, or mother liquor, is maintained in substantially streamlined, vertical rotation, and another relatively quiescent zone relatively free of turbulence.

During crystallization, the aluminum sulfate from the mother liquor, in addition to forming new crystals, also deposits on existing aluminum sulfate crystals in the mother liquor to cause the growth thereof, thus providing a suspension of varied size crystals. The induced flow within the mother liquor classifies these varied size crystals by separating and substantially removing the undesired fine crystals from the circulating suspension in the mother liquor. The removed undesired fine crystals are segregated in the quiescent zone of the mother liquor and the larger crystals are segregated in the other agitated zone of the crystallizer. Thus, within the mother liquor there will have been established in the quiescent zone a suspension of fine crystals suspended in partially supersaturated mother liquor, whereas in the other of the zones there will have been established a body of large crystals within the more highly supersaturated mother liquor. The suspension of fine crystals in the mother liquor is then removed, whereafter the fine crystals then are appropriately destroyed, by heating and the like, to redissolve them in the solution. This solution may then be recooled and returned to the crystallizer.

It is essential to maintain the sulfuric acid, in the crystallizer, in the aforesaid range of about 3% to about 40% to insure the obtainment of aluminum sulfate crystals of sufficiently firm structure and size which are practical for commercial production. The sulfuric acid range is necessary and critical in order to prevent the crystallization of basic aluminum sulfate which precipitate in a gelatinous form and, accordingly, interfere with the success of the operation. In addition, this acid range constrains the ferric sulfate, which is present in small concentration, to remain in solution while permitting the desired selective crystallization of the desired aluminum sulfate crystals.

In addition, optimum crystalline size and structure of the aluminum sulfate, are obtained by driving the crystallization, from solution, at a relatively high supersaturation temperature differential. Accordingly, it is contemplated that the aluminum sulfate be crystallized from solution maintained at a temperature which is more than 3° F. below, and preferably 6 to 10° F. below the temperature at which the solution is saturated but not supersaturated. In other words, the operating concentration of the solution is equivalent to a saturated concentration of the solution at a temperature of more than 3° F. and preferably 6 to 10° F. above the operating temperature of the crystallization of this invention.

The heated solution containing the acid and redissolved crystals may, however, also be used in part for leaching calcined aluminum-iron containing clays in order to extract the aluminum therefrom. The leaching of the clays is accomplished by a two step process in which the clay in the first step is present in an amount insufficient to neutralize the acid in the solution containing the redissolved crystals so as to maintain this solution in an acidic condition. Leaching of the aluminum-iron containing clay in its first step extracts, in addition to the aluminum therefrom, also some quantity of the iron therein which contaminates the extract. The iron in the clay should preferably be in the ferric state, but if not the solution in the first step may be treated with oxygen containing chemicals to convert the dissolved iron into the ferric form. Upon completion of the extraction in the first step, the complete admixture of clay residue and extract solution is subjected to a second step treatment wherein the solution containing the redissolved crystals and enriched with additional dissolved aluminum is alkalized by the addition of an appropriate basic material to induce precipitation of the iron dissolved in the solution onto the clay residue of the first step, whereafter the undissolved clay residue of the mixture is removed from the solution by appropriate separation, as by decantation of the enriched solution of aluminum sulfate, or by filtration. This enriched solution of aluminum sulfate is then cooled and returned to the crystallizer in supersaturated condition. Simultaneously or intermittently the large product crystals of aluminum sulfate produced are also removed from the crystallizer. The large product crystals of aluminum sulfate may be appropriately filtered off and the remaining solution also returned to the crystallizer.

The precise procedure to be used for leaching aluminum from aluminiferous ores depends on the nature of the ore. Specific procedures are described in U.S. Department of Commerce Bulletin No. 267, entitled "Acid Processes for the Extraction of Alumina," and TVA report entitled, "Development of a Sulfuric Acid Process for Production of Alumina from Clay," published by W. H. Walthall et al. in The Transaction of the A.I. Ch. E. 41, 53–140, February 1945. Generally, four distinct methods are applicable. If the clay is easily soluble in acid solution (I) the raw clay and acid are simply mixed and agitated to solubilize the aluminum as aluminum sulfate. For less reactive clays, (II) the solubility of the ore may be improved by a preliminary calcination in the temperature range 600–800 C. before mixing with the acid solution. Where the calcination procedure is ineffective, further benefits may be gained by (III) baking the raw or calcined ore with concentrated acid in the range 200–500 C. or (IV) reacting the calcined or raw ore with acid at higher temperatures and pressures in pressurized autoclaves. By suitable modification of procedures, any of these methods of extracting alumina from clay may be adapted to applicant's process for producing purified crystalline aluminum sulfate.

By way of a specific example, the details for extracting aluminum sulfate from calcined clay as described in the TVA report will be recited. Generally, an aluminum-iron containing clay, or shale, is received in dry lump form and transferred to a clay muller and wetted with water in order to plasticize and homogenize the clay. The moist plastic clay is then fed into an extruder and formed into pellets. These pellets are then dried and hardened and then calcined to 1200° F. The calcined pellets are crushed to yield a predominant size of −8 +30 mesh clay granules for feed to extraction tanks. Undersized fines are recycled to the claying muller. This conditioning and calcination of the clay granules permits simple separation of the clay residue from the extraction solution by decantation. In addition, calcination to 1200° F. has been found necessary in order to speed up the rate and extent of solubility of the aluminum in the clay by the extraction solution.

The object of the clay preparation operation is to convert the clay into discrete granules of such size that rapid and efficient extraction can be attained with the granules of sufficient coarseness so that rapid and efficient washing of the clay residue by continuous sedimentation can also be achieved. The clay granules will be kept in heated extractor tanks by agitation, wherein they are kept in contact with hot acidified solution for a sufficient time to extract the major portion of aluminum from the clay. In some cases, the extraction time is of the order of one hour; in other cases ten or more hours of clay retention time are required. Exothermic heat of reaction of the acid and clay as well as the residual sensible heat of the calcined clay has been found adequate to maintain the extraction temperatures. If desired, this heat can also be utilized, by appropriate heat exchanger, in the crystallizers for evaporation of water in a double effect operation to minimize the need for auxiliary heating systems. Optimum conditions for minimizing iron extraction from the clay are met by proportioning the clay to acid in the extractors to yield an ultimate basic solution. This is done in two steps or stages.

The bulk of the clay, generally 80 to 90%, is proportioned so as to be added at the beginning of the extraction treatment so that it is combined in the first stage with acidified recycled mother liquor from the crystallizer to leave some residual acidity in the extractors. The excess acid in solution, in its firs stage, assures rapid and efficient extraction of aluminum from this portion of the calcined clay, generally this will comprise approximately 90% of the available aluminum in this portion. However, a substantial portion of the iron of the calcined clay will also go into solution. The mixture is then passed to the second stage, wherein the solution is alkalized by the basic material to induce precipitation of the dissolved iron. Preferably, this basic material should comprise the addition of the remaining 10 to 20% portion of the clay as an alkalizing and precipitating agent for the dissolved iron in the extraction solution. In this second stage, since the solution potential of aluminum exceeds that of iron, the former will go into solution and cause the latter to be precipitated on the clay residue to yield a residual level, in the solution, of less than 1.0% $Fe_2O_3/Al_2O_3$ from which level of iron it was found that the specific method of crystallization was more than adequate to yield aluminum sulfate necessary for production of $Al_2O_3$ of metallic purity required in the manufacture of aluminum metal.

This two step extraction process is found to provide unexpected advantages over heretofore single stage extraction methods in minimizing the contamination of the extracted aluminum with iron. It was found that upon addition of the second portion of the calcined clay, the iron precipitated in a more dense mass and was more easily and readily separated from solution by sedimentation. In the absence of the clay residue from the extractions, the iron was found to be precipitated as a gelatinous floc which was extremely difficult to separate from the extraction solution.

In addition to facilitating the precipitation of iron in the extract solution, the second portion of the calcined clay added was also found to provide an additional enrichment by extraction of aluminum therefrom of the extract solution with aluminum sulfate. This extraction of an aluminum sulfate from the second portion of the calcined clay was found to be about 70% to provide an overall recovery of aluminum in both extractions of the two stages in the range of about 80% to about 85%. Subsequent to the extraction, the undissolved clay residue and the extraction solution are then separated by decantation or filtration. The decanted and/or clarified extraction solution, enriched with aluminum sulfate, is then cooled and introduced into the crystallizer referred to above in supersaturated condition. In alternate circumstances where the ore needs to be baked with concentrated acid to solubilize the aluminum a portion of acidified iron-enriched mother liquor is concentrated by progressive evaporation of water and crystallization of aluminum sulfate until the iron sulfate also begins to crystallize out. This concentrated acid containing solution is then mixed with the ore and baked at temperatures in the range 200–500 C. for a time sufficient to solubilize the aluminum content of the ore as aluminum sulfate. The baked residue containing aluminum sulfate and iron oxides is then leached with hot dilute mother liquor or water, neutral only slightly acid, to minimize the amount of iron oxides extracted. This solution, enriched with aluminum sulfate, is then returned to the crystallizer for production of purified aluminum sulfate crystals.

As regards the desired large product crystals removed from the crystallizer, they may be appropriately conditioned by filtration, drying and the like as the ultimate product, or the crystals may be further decomposed into alumina ($Al_2O_3$) for utilization in the manufacture of aluminum metal. Since the decomposition of aluminum sulfate evolves sulfuric oxides, the gases may be appropriately recovered for conversion into sulfuric acid for reuse in the operation with additional economic advantages. Such procedures are described in British Patent 748,524 as well as the TVA and the U.S.B.M. reports referred to above. The resultant alumina may then be employed in accordance with conventional procedures in the manufacture of aluminum metal.

Figure 2:
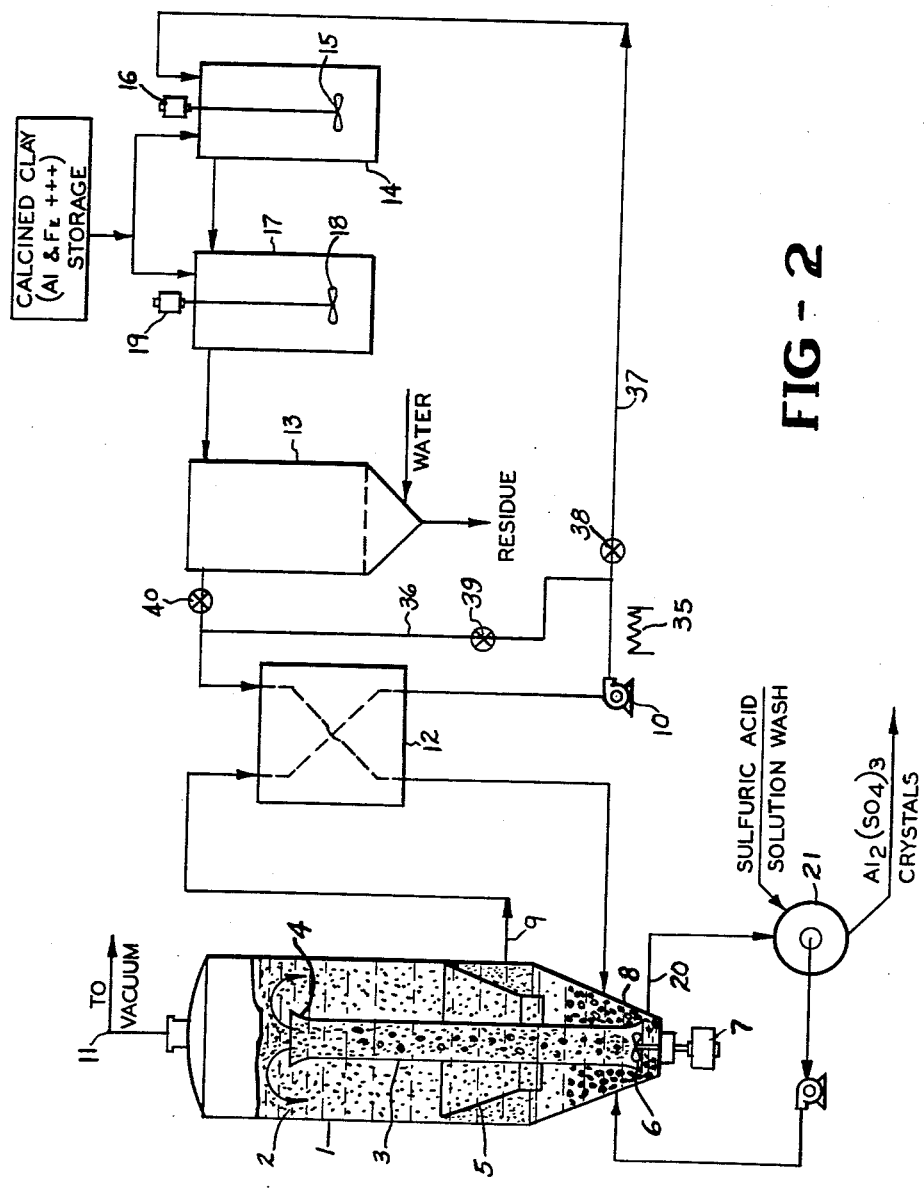
FIGURE 2 is an elevational view schematically depicting apparatus employed for one embodiment of this invention.

Referring to the drawings, the main crystallization process occurs in the crystallizer tank 1 containing a saturated or supersaturated solution 2 of aluminum sulfate containing suspended crystals of aluminum sulfate. As illustrated in FIGURE 2, the suspension crystals are circulated upwardly, by means of a propeller 6 driven by a motor 7, through a tubular conduit 3 which is located axially within a crystallizer tank 1. When the upward flowing suspension reaches the top of conduit 3, it flows over the top edges 4 of the tubular conduit and then downwardly through a conical false bottom 5 located at an intermediate portion of the crystallizer tank walls 1, and subsequently descends into the lowermost funnel shaped chamber or bottom 8 of the tank. When the circulating suspension reaches the bottom of the tubular conduit 3 it is again forced upwardly therethrough to cause an inner circulatory system within the supersaturated solution or mother liquor 2. As will be obvious, although a specific circulating system has been described for inducing movement in the mother liquor, other means can be readily utilized as equivalents thereof.

Generally, the crystallizers are contemplated to be operated at 180° F. or less with a supersaturated solution containing about 10% to about 35% aluminum sulfate, and even extending to as low as about 8%. As noted above, this mother liquor is acidified with acidity thereof necessarily of the order of about 3% to about 40% excess sulfuric acid and at a temperature between 50 and 185° F. As the mother liquor circulates, crystals are in the growing state in which more crystalline material deposits on the surface of existing crystals. During the crystal growth, the undesired fine crystals are constantly removed by means of the circulating stream induced in the mother liquor to be conducted upwardly below the conical false bottom 5 and between it and the walls of the crystallizer tank 1 to define what is commonly referred to as a fines trap from which the fine crystals, suspended in the mother liquor, are removed by means of a fine crystal outlet conduit 9. This removal is effected by positive displacement of liquor from the tank by means of a pump 10, which causes an upward flow in the zone existing immediately underneath the conical false bottom 5 in the walls of the crystallizer tank 1.

As can be readily seen, this space beneath the conical false bottom 5 and the walls of the crystallizer tank 1 forms a zone in which the mother liquor is segregated to provide a suspension of very fine crystals suspended in the mother liquor. This zone is attained by means of the induced flow in the space beneath the conical false bottom 5 and the walls of the tank 1 which separates or classifies the fine crystals from the large crystals by means of the rising velocity of the solution in this space. In addition, the circulation in the crystallizer tank also segregates the mother liquor to provide in the area of the funnel shaped chamber or bottom 8 of the tank a second zone comprised essentially of relatively large crystals of aluminum sulfate immersed in the mother liquor. Concentration of the mother liquor in the tank 1 may be accomplished, as set out in applicant's aforesaid patent, U.S. No. 2,856,270, by means of cooling or preferably by evaporation with evaporation and removal of water vapors facilitated by means of a line 11 which communicates with the upper portion of the crystallizer tank 1 and is connected to means, not shown, for producing a vacuum, such as a series of steam jet vapors and the like.

The solution containing the undesired fine crystals which is removed by conduit 9 is suitably heated in order to redissolve the fine crystals therein. Generally, this redissolving of the fine aluminum sulfate crystals is accomplished by heating the suspension to approximately 5–25° F. above the crystallizer temperature for a few minutes. If it is desired, this heating may be accomplished by means of a counter current heat exchanger 12 utilized in conjunction with the extract solution decanted from the settling tank 13. Preferably this heat exchange and heat exchanger 12, is accomplished by means of vapor-phase interchange substantially in accordance with the method outlined in an article by D. F. Othmer et al. in "Chemical Engineering Progress," volume 57 (No. 1), dated January 1961 and entitled "Vapor Reheat Flash Evaporation Without Metallic Surfces," and in U.S. Letters Patent No. 2,803,589. The redissolving of the fine crystals of aluminum sulfate in the mother liquor produces a clarified solution, part of which may be introduced into an extraction tank 14 in which calcined clay, preferably at an elevated temperature, is charged. The calcined clay is kept in suspension by means of an agitator 15 suitably powered by a motor 16.

The extraction of the calcined clay in the tank 14 constitutes the first stage of this operation with the digesting of the clay permitted to proceed for approximately one to two hours, at the end of which time approximately 90% of the aluminum is leached from the clay. Generally, the total extraction can be accomplished with a charge of hot calcined clay and sufficient clarified solution recycled from the crystallizer to yield a saturated solution of aluminum sulfate at 160° to 180° F. In the preferred process about 80–90% of the calcined clay charge is added in this first stage. The excess acid in this clarified solution assures rapid and efficient extraction of the aluminum from this portion of the calcined clay. However, as noted above, a substantial portion of the iron will also go into solution. Upon completion of the extraction of the first stage, the admixture of undissolved clay residue in the extract solution is charged into a second extraction tank 17 comprising the second stage of the extraction operation. A second addition of the calcined clay is then made in an amount sufficient to alkalize the extract solution and simultaneously causing the dissolved iron to reprecipitate on the undissolved clay residue, from which it came, to yield a residual level of less than 1.0% $Fe_2O_3/Al_2O_3$.

As in the previous stage, the calcined clay is kept in suspension in the extraction tank 17 by means of an agitator 18 driven by a motor 19. Generally, about 70% of the aluminum will be easily extracted in this second stage extraction from the added portion of the clay with an overall recovery of aluminum in both extractors being in the range of from about 80% to about 85% to provide a practical and economical extraction suitable for commercial production. Although only two stages of extraction have been discussed, it is to be understood that such extraction may be carried on in any desired number of stages. Upon completion of the extraction operation, the mother liquor with the suspended undissolved residue therein is charged into a settling tank 13 wherein the undissolved clay residue is permitted to settle by sedimentation followed by decantation of the clarified extract solution from the tank. If desired, means may be provided for washing the separated clay residue with an appropriate solvent, such as water, with subsequent removal of the wash residue from the settling tank. As indicated above, the hot clarified extract solution is then passed through the heat exchanger 12 in counter current relationship with the portion of the mother liquor being recycled from the crystallizer tank 1. Upon passage of the extract solution through the heat exchanger, it is then charged into the lower portion of the crystallizer for admixture with the main body of the supersaturated solution 2 in tank 1 to again take part in the crystallizing process.

The product crystal matter is removed from the crystallization tank by means of a product outlet 20, and appropriately conveyed to a filter 21 whereat the filtrate separated from the crystals may be returned to the crystallizer tank 1. The separated crystals may be additionally washed with an appropriate wash solution such as concentrated sulfuric acid with the elutriate of the washing also returned to the crystallizer tank. The above constitutes a one-stage process of obtaining crystals of aluminum sulfate suitable for commercial application from aluminum-iron containing clays in the single stage operation.

Figure 3:
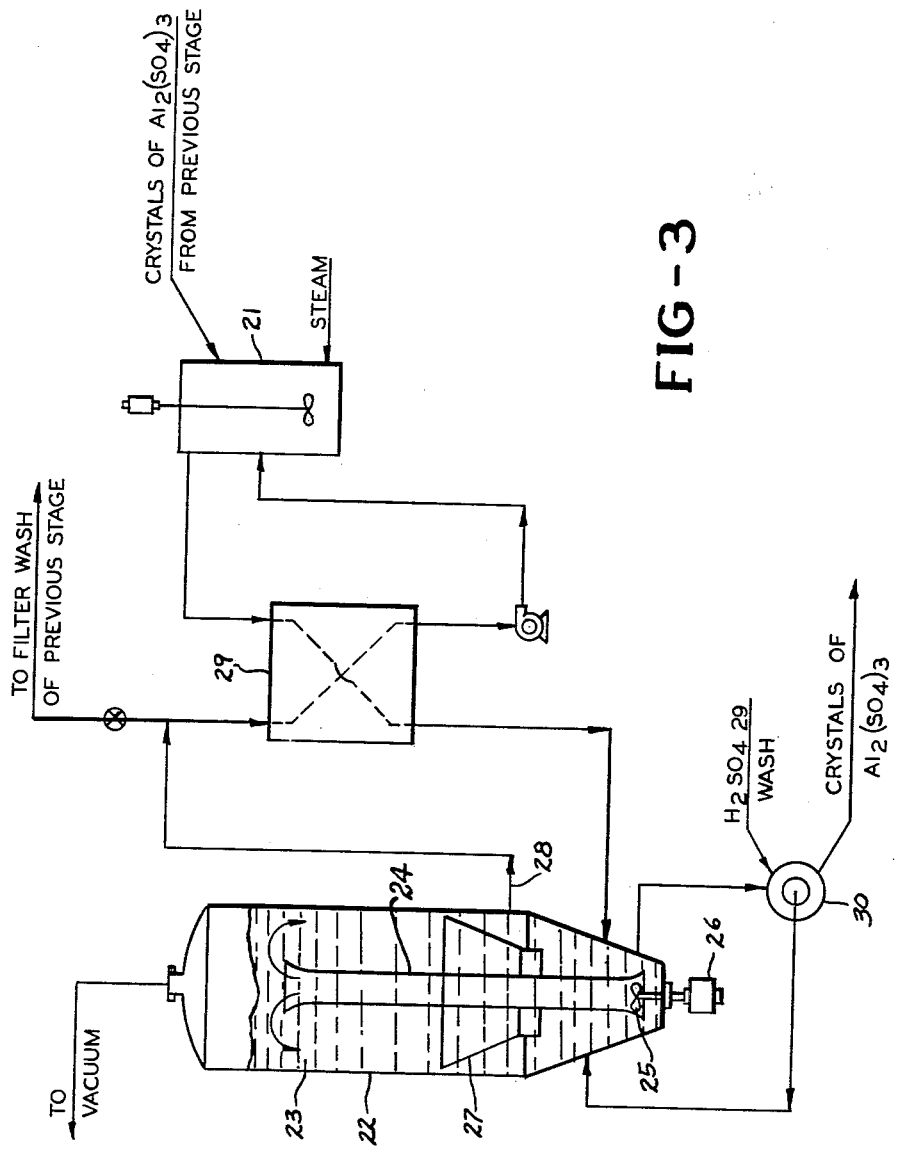
FIGURE 3 is an elevational view schematically depicting additional apparatus for utilization in conjunction with that of FIGURE 2 for practicing another embodiment of this invention.

Although the specific sequence of operations has been described above, it is to be understood that various modifications and embodiments may be also employed. For example, the clarified solution emanating from the heat exchanger 12 may be further heated by an appropriate heater 35 of the many types known in the art, for example, the heater may be either electric or any of the conventional heat exchangers heated by steam and the like. Subsequent to heating, a portion of the clarified solution may be by-passed through line 36 to join to output from settling tank 13. If desired, the volume of the by-pass solution may be proportioned as desired to the volume directed in line 37 to the extractor tank 14. If and where desired, the entire clarified solution may be completely by-passed by the extract apparatus illustrated in the drawings. This direction of the solution may be accomplished by valves 38, 39 and 40 activated in accordance with conditions desired. Further, it is to be also understood that where aluminum sulfate crystals of still greater purity are desired, the crystallization may be achieved in a plurality of stages with the application of a single additional stage being illustrated in FIGURE 3. As illustrated in FIGURE 3, the crystals of aluminum sulfate from the previous stage are charged to a solution tank 21, wherein they are dissolved into a concentrated solution of aluminum sulfate recycled from a second crystallization tank 22. In order to facilitate the dissolving of the aluminum sulfate crystals, additional heat may be provided to accomplish this purpose as, for example, by the injection of steam. The aluminum sulfate solution enriched with the aluminum sulfate crystals from the previous stage are then passed to a heat exchanger 29 and charged into the lower portion of the crystallizer tank 22 to be admixed with a saturated or supersaturated aluminum sulfate solution 23 containing suspended crystalline matter which is undergoing concentration by cooling or evaporation as in the preceding stage. As before, the suspension 23 is circulated upwardly through a tubular conduit 24 located axially within the tank 22 with the flow thereof being induced by means of an upwardly directing propeller 25 driven by a motor 26. When the upward flowing suspension reaches the top it flows over the edges of the tubular conduit and then downwardly through the conical false bottom 27 located at an intermediate portion of the tank and then further downwardly into the lowermost funnel shaped chamber of the tank whereat it is again caused to flow upwardly through the axially located conduit 24. As before, the undesired fine crystals are removed from the circulating suspension in tank 22 by classifying the undesired fine crystals upwardly between the false bottom 27 and the walls of the crystallizing tank 22, and then into the fine crystal outlet conduit 28. The withdrawn solution containing the fine crystals of aluminum sulfate is then appropriately heated to dissolve the crystals into solution, however, if desired, a portion of the solution carrying the fine crystals may be by-passed to provide the wash for the separated crystals of the previous stage. The clarified solution formed by the dissolving of the fine crystals is then charged into the solution tank 21 to provide a solvent for a charge of aluminum sulfate crystals therein.

As the suspension in crystallizer tank 22 circulates, the crystals are again being either deposited out of solution or are in the growing stage in which more crystalline matter deposits on the surface of the existing crystals. The product crystals produced in crystallizing tank 22 may then be removed with the product crystals filtered off, as by means of a filter 30, and the separated suspension may be either discarded or returned to the crystallizing tank 22. The separated crystals may be washed with a concentrated sulfuric acid solution with elutriate of the washing directed into crystallizing tank 22 to replenish the sulfuric acid utilized in reaction with the aluminum extracted from the clay.

The ultimate product aluminum sulfate crystals may be further processed to the condition desired. For example, the product crystals may be dried and dehydrated directly or they may be suitably dewatered on a screen filter with remelting and regranulation of the salt in a dehydrated form. Also, where the aluminum sulfate crystals are desired to be utilized for the production of alumina in the manufacture of aluminum metal, the crystals may be decomposed by various processes well known in the art, as noted above.

Although a detailed description of the invention has been provided, it is realized that those skilled in the art may make modifications in and adaptations of the process and apparatus described above without departing from the spirit and the scope of this invention. It is, therefore, to be specifically understood that such obvious modifications are considered within the scope of the herein described process and apparatus.

Accordingly, what is claimed is:

1. A process of making aluminum sulfate comprising:
   (a) providing in a first vessel a first suspension, comprised of substantially pure crystalline aluminum sulfate suspended in a supersaturated first solution of aluminum sulfate acidified with sulfuric acid in the range of about 3% to about 40%;
   (b) further supersaturating said first solution by concentration to induce crystallization of aluminum sulfate therefrom;
   (c) segregating by hydraulic elutriation from said first suspension in said first vessel a first zone of a second suspension of a first system of fine crystals of aluminum sulfate suspended in said first solution and a second zone of a first system of relatively larger crystals of aluminum sulfate in said first solution;
   (d) withdrawing said second suspension in an accompanying portion of said first solution from said first vessel;
   (e) dissolving said first fine crystals of said withdrawn second suspension into the said accompanying portion of said first solution to form a second solution of aluminum sulfate;
   (f) leaching an aluminum-iron-containing ore with said second solution with said ore being present in an amount insufficient to neutralize said second solution whereby the aluminum and iron of said ore are extracted therefrom and whereby there is formed an enriched third solution containing dissolved aluminum and iron in its ferric state;
   (g) alkalizing said third solution with an aluminum-iron containing ore in an amount sufficient to precipitate the dissolved iron in said third solution to form an enriched fourth solution of reduced iron content;
   (h) separating said fourth solution from the undissolved residue therein;
   (i) introducing said fourth solution into said first vessel; and
   (j) withdrawing from said second zone of said first vessel said first system of relatively larger crystals in said first solution.

2. The method of claim 1 including the steps of:
   (a) separating the said withdrawn first system of relatively larger crystals from the said accompanying withdrawn first solution; and
   (b) returning the separated first solution to said first vessel.

3. The method of claim 2 including the steps of:
   (a) washing the separated first system of relatively larger crystals with an aqueous medium acidified with sulfuric acid; and
   (b) returning the elutriate of said washing to said first vessel.

4. The method of claim 1 including the steps of:
   (a) providing in a second vessel a third suspension of aluminum sulfate crystals suspended in a fifth solution supersaturated with aluminum sulfate and acidified with sulfuric acid in the range from about 3% to about 40% with said fifth solution containing said withdrawn first system of relatively larger crystals;
   (b) further supersaturating said fifth solution by concentration to induce crystallization of aluminum sulfate therefrom;
   (c) segregating by hydraulic elutriation from said third suspension in said second vessel a third zone of a fourth suspension of second system of fine crystals of aluminum sulfate in said fifth solution and a fourth zone of a second system of relatively larger crystals of aluminum sulfate in said fifth solution;
   (d) withdrawing said fourth suspension in an accompanying portion of said fifth solution from said second vessel;
   (e) dissolving said second fine crystals of said withdrawn fourth suspension into the said accompanying portion of said fifth solution to form a sixth solution supersaturated with aluminum sulfate;
   (f) returning said sixth solution to said second vessel; and
   (g) withdrawing from said fourth zone in said second vessel said second system of relatively larger crystals in said fifth solution.

5. The method of claim 3 including the steps of:
   (a) providing in a second vessel a third suspension of aluminum sulfate crystals suspended in a fifth solution supersaturated with aluminum sulfate and acidified with sulfuric acid in the range of about 3% to about 40% with said fifth solution containing said withdrawn first system of relatively larger crystals;
   (b) further supersaturating said fifth solution by concentration to induce crystallization of aluminum sulfate therefrom;

(c) segregating by hydraulic elutriation from said third suspension in said second vessel a third zone of a fourth suspension of second system of fine crystals of aluminum sulfate in said fifth solution and a zone of a second system of relatively larger crystals of aluminum sulfate in said fifth solution;

(d) withdrawing said fourth suspension in an accompanying portion of said fifth solution from said second vessel;

(e) dissolving said second fine crystals of said withdrawn fourth suspension into the said accompanying portion of said fifth solution to form a sixth solution supersaturated with aluminum sulfate;

(f) returning said sixth solution into said second vessel; and (g) withdrawing from said fourth zone in said second vessel said second system of relatively larger crystals in said fifth solution.

6. The method of claim 5 including the step of utilizing a portion of said sixth solution for said aqueous medium acidified with sulfuric acid.

7. The method of claim 5 including the steps of:
(a) separating the withdrawn second system of relatively larger crystals from the said accompanying withdrawn fifth solution; and
(b) returning the separated fifth solution into said second vessel.

8. The method of claim 7 including the step of returning a portion of the separated fifth solution to said first vessel.

9. The method of claim 7 including the step of utilizing a portion of said sixth solution for said aqueous medium acidified with sulfuric acid.

10. The method of claim 7 including the steps of:
(a) washing the separated second system of relatively larger crystals with a second aqueous medium acidified with sulfuric acid; and
(b) utilizing of portion of the elutriate of said washing for said aqueous medium acidified with sulfuric acid.

11. The method of claim 10 including the step of utilizing a portion of said sixth solution for said aqueous medium acidified with sulfuric acid.

12. The method of claim 10 including the step of returning a portion of the separated fifth solution to said first vessel.

13. A process of making aluminum sulfate comprising:
(a) providing in a first vessel a first suspension maintained at a temperature of between 50° F. and 185° F. comprised of substantially pure crystalline aluminum sulfate suspended in a supersaturated first solution of aluminum sulfate acidified with sulfuric acid in the range of about 3% to about 40%;
(b) further supersaturating said first solution by concentration to induce crystallization of aluminum sulfate therefrom;
(c) segregating by hydraulic elutriation from said first suspension in said first vessel a first zone of a second suspension of a first system of fine crystals of aluminum sulfate suspended in said first solution and a second zone of a first system of relatively larger crystals of aluminum sulfate in said first solution;
(d) withdrawing said second suspension in an accompanying portion of said first solution from said first vessel;
(e) dissolving said first fine crystals of said withdrawn second suspension into the said accompanying portion of said first solution to form a second solution of aluminum sulfate;
(f) supersaturating said second solution;
(g) introducing said supersaturated second solution into said first vessel; and,
(h) withdrawing from said second zone of said first vessel said first system of relatively larger crystals in said first solution.

14. A process according to claim 13 wherein said second solution is supersaturated by cooling.

References Cited in the file of this patent
UNITED STATES PATENTS

| | | |
|---|---|---|
| 2,883,273 | Saeman | Apr. 21, 1959 |
| 2,951,743 | Kretzschmar | Sept. 6, 1960 |
| 2,958,580 | Loevenstein | Nov. 1, 1960 |